United States Patent
Wolter et al.

(10) Patent No.: US 11,691,501 B2
(45) Date of Patent: Jul. 4, 2023

(54) IN-TANK FASTENING DEVICE

(71) Applicant: KAUTEX TEXTRON GMBH & CO. KG, Bonn (DE)

(72) Inventors: Gerd Wolter, Koenigswinter (DE); Markus Janich, Troisdorf (DE); Udo Wichartz, Koenigswinter (DE); Sabine Schneider, Bonn (DE); Axel Frohwein, Neufahrn (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 730 days.

(21) Appl. No.: 16/474,760

(22) PCT Filed: Jan. 2, 2018

(86) PCT No.: PCT/EP2018/050077
§ 371 (c)(1),
(2) Date: Oct. 7, 2019

(87) PCT Pub. No.: WO2018/122414
PCT Pub. Date: Jul. 5, 2018

(65) Prior Publication Data
US 2020/0384851 A1    Dec. 10, 2020

(30) Foreign Application Priority Data

Dec. 30, 2016  (DE) ............. 10 2016 226 339.0

(51) Int. Cl.
*B60K 15/03* (2006.01)
*F16B 2/22* (2006.01)
*F16B 2/20* (2006.01)

(52) U.S. Cl.
CPC ...... *B60K 15/03* (2013.01); *B60K 2015/0344* (2013.01); *B60K 2015/03467* (2013.01);
(Continued)

(58) Field of Classification Search
CPC ............ B60K 15/03; B60K 2015/0344; B60K 2015/03467; B60K 2015/03493;
(Continued)

(56) References Cited

U.S. PATENT DOCUMENTS 4,883,397 A  * 11/1989 Dubost .................. F16B 2/245
                                                        411/522
5,211,547 A  *  5/1993 Gaston .................. F02M 37/10
                                                        417/423.15
(Continued)

FOREIGN PATENT DOCUMENTS

CN  101687366    3/2010
CN  102026838    4/2011
(Continued)

OTHER PUBLICATIONS

International Search Report, dated Apr. 16, 2018, received in corresponding PCT Application No. PCT/EP2018/050077.
(Continued)

*Primary Examiner* — Nkeisha Smith
(74) *Attorney, Agent, or Firm* — Grossman, Tucker, Perreault & Pfleger, PLLC

(57) ABSTRACT

A device for fastening tank insert parts, wherein the device has a holding element for holding the tank insert part and at least one elastically deformable clamping device which is connected to the holding element and by means of which a fastening structure can be received. Furthermore, a plastic tank having a fastening structure which is arranged in the interior thereof, and having a device according to the invention which is arranged thereon for fastening tank insert parts.

22 Claims, 9 Drawing Sheets

(52) U.S. Cl.
CPC ....... *B60K 2015/03493* (2013.01); *F16B 2/20* (2013.01); *F16B 2/22* (2013.01)

(58) Field of Classification Search
CPC ...... F16B 2/20; F16B 2/22; F16B 2/24; F16B 2/241; F16B 2/243; F16B 2/245
See application file for complete search history.

(56) References Cited

U.S. PATENT DOCUMENTS

| | | | |
|---|---|---|---|
| 6,138,524 | A | 10/2000 | Tsuda et al. |
| 8,584,339 | B2 | 11/2013 | Mbog et al. |
| 9,079,490 | B2 | 7/2015 | Lemoine et al. |
| 9,085,229 | B2 | 7/2015 | Gattozzi et al. |
| 9,291,180 | B2 * | 3/2016 | Nakazato ................... F16B 5/10 |
| 9,796,260 | B2 | 10/2017 | Kataoka |
| 10,197,192 | B2 * | 2/2019 | Jung ......................... B64C 1/14 |
| 2003/0102035 | A1 | 6/2003 | Dasilva et al. |
| 2004/0045962 | A1 | 3/2004 | Firtion et al. |
| 2004/0086331 | A1 * | 5/2004 | Iwamoto ................. B60K 15/03 403/327 |
| 2005/0217735 | A1 | 10/2005 | Firtion et al. |
| 2012/0305724 | A1 * | 12/2012 | Diez Herrera ........ F16B 21/075 248/231.81 |
| 2014/0374554 | A1 * | 12/2014 | Jordan ................. F16M 13/022 248/206.5 |
| 2015/0292648 | A1 * | 10/2015 | Jimenez ................ F16L 3/1075 248/68.1 |
| 2016/0053918 | A1 * | 2/2016 | Flynn ...................... F16L 3/237 248/68.1 |
| 2016/0223171 | A1 * | 8/2016 | Gibbons ................ H01R 13/03 |

FOREIGN PATENT DOCUMENTS

| | | |
|---|---|---|
| CN | 105522912 | 4/2016 |
| DE | 102009052198 | 6/2010 |
| DE | 102014224973 | 6/2016 |
| DE | 102014225016 | 6/2016 |
| EP | 0372507 | 6/1990 |
| JP | 2012-67785 | 4/2012 |
| KR | 10-2009-0040099 | 4/2009 |

OTHER PUBLICATIONS

International Preliminary Report on Patentability, dated Apr. 23, 2019, received in corresponding PCT Application No. PCT/EP2018/050077.

Office Action from related Chinese Appln. No 201880015160 X, dated Feb. 22, 2022. English translation attached.

* cited by examiner

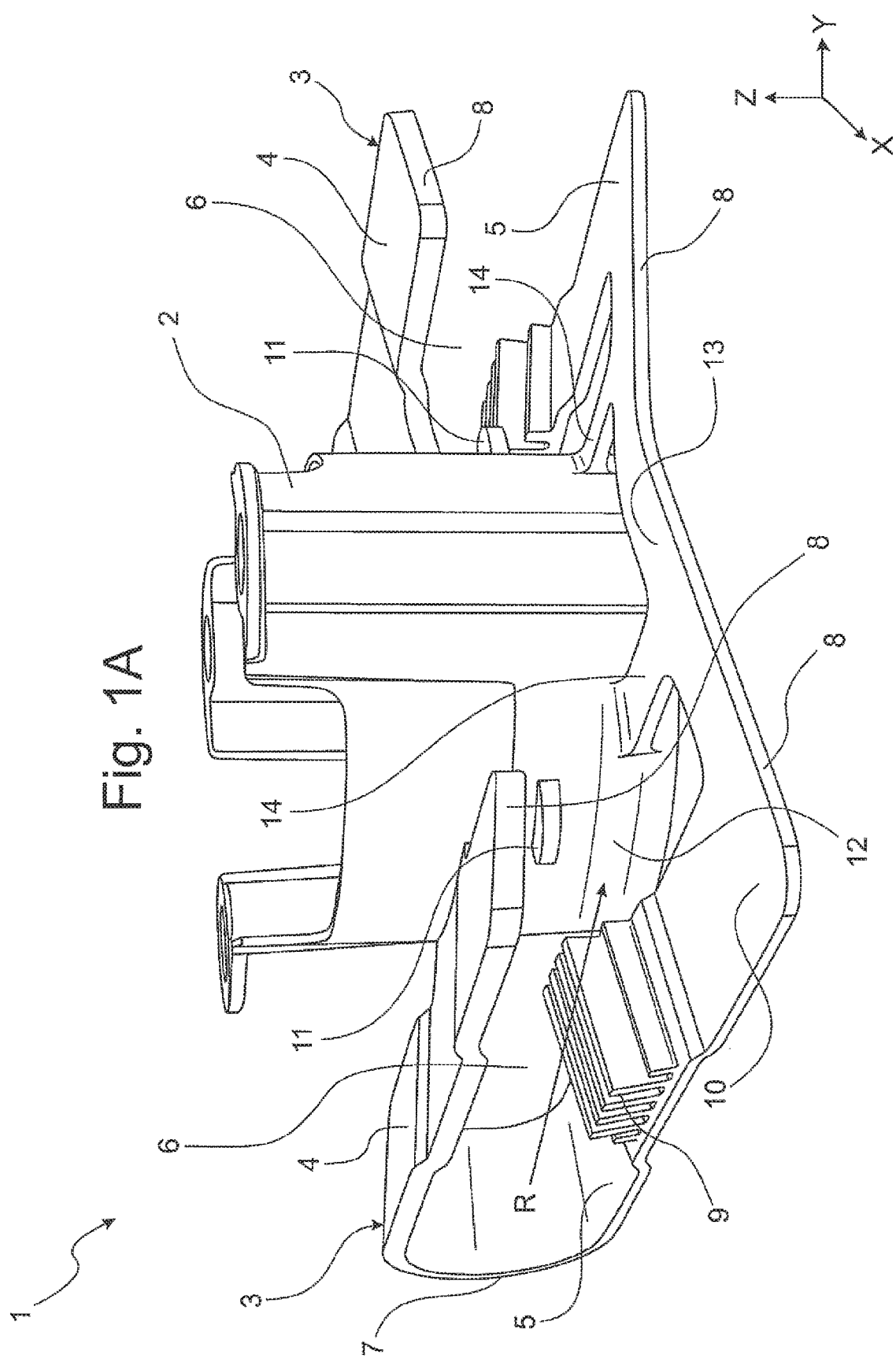

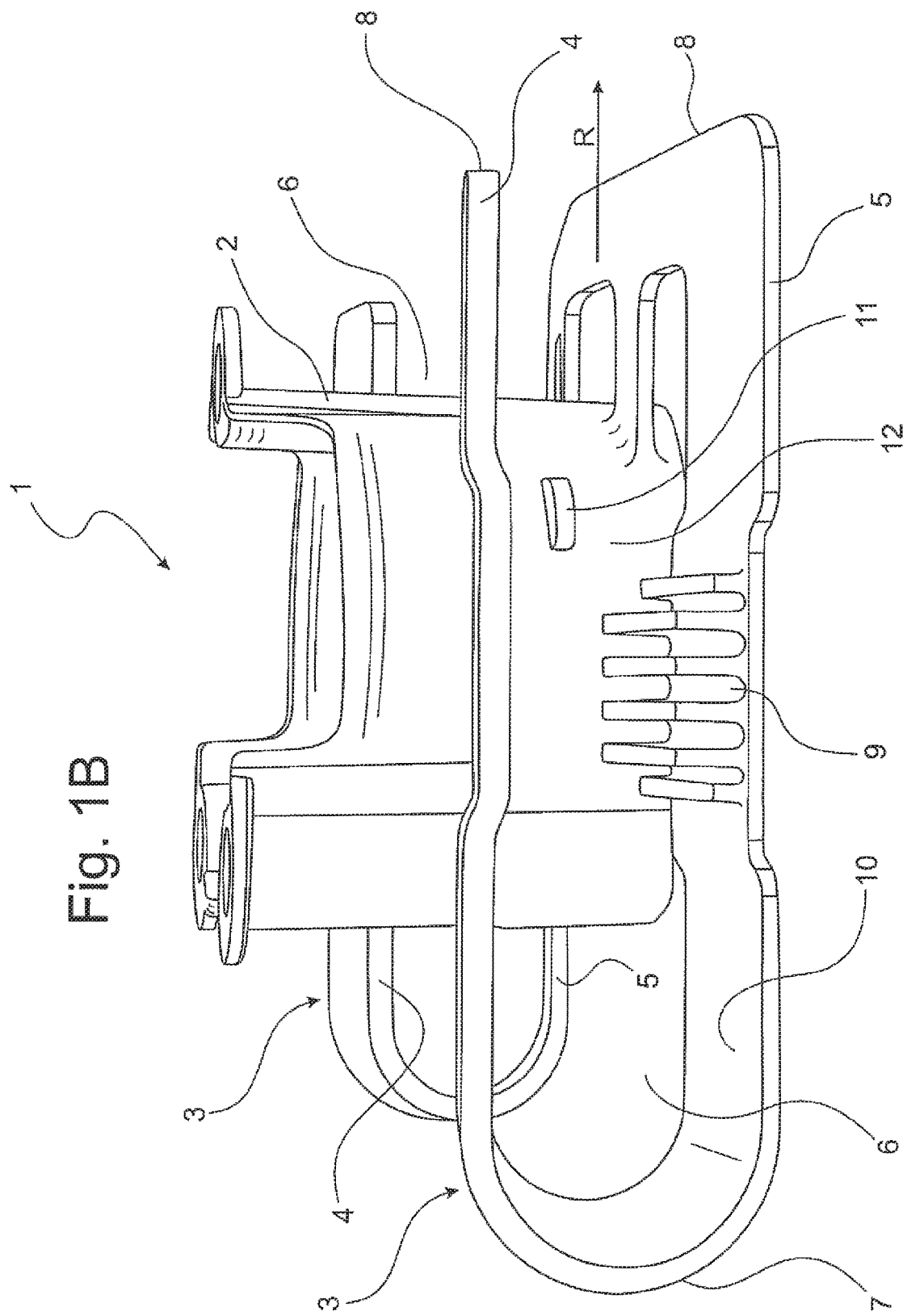

IN-TANK FASTENING DEVICE

FIELD

The present invention relates to the field of component fastenings for tanks, particularly for plastics-material tanks, and even more preferably for plastics-material fuel tanks.

BACKGROUND

Tanks, and in particular plastics-material tanks such as plastics-material fuel tanks, typically contain specific components, also referred to as tank installation components, which for the orderly functioning of the tank have to be disposed and fastened in the interior of said tank. Preferably, such tank installation components are for example valves or lines, such as aeration lines or ventilation lines, or sensors, for example filling-level sensors.

In the prior art, such tank installation components are usually fastened to the internal side (in-tank welding) or optionally also to the external side (on-tank welding) of the tank wall by way of direct welding, indirect welding or riveting. In the case of in-tank welding this harbors in particular the disadvantage of a limited effective radius on account of the use of the welding device, while on-tank welding is associated with an increase in terms of emissions.

The object of the present invention therefore lies in an improved in-tank fastening of tank installation components. Easy and reliable fastening of the tank installation components without welding or the use of further technical auxiliary means is in particular to be provided herein.

A plastics-material tank can be, for example, a fuel container, in particular for diesel or gasoline, or a liquid container for an aqueous urea solution which is required for an SCR (selective catalytic reduction) method. It is preferably a plastics-material fuel tank, even more preferably a plastics-material fuel tank of which the wall is embodied in multiple layers. Even more preferably, the tank wall of the fuel container comprises an HDPE (high-density polyethylene), an EVOH (ethylene vinyl alcohol copolymer), and/or a PA (polyamide). The fuel container is likewise preferably produced by the extrusion blow-molding method.

SUMMARY

The device according to the invention for fastening tank installation components has a holding element for holding the tank installation component and at least one clamping installation that is connected to the holding element, wherein the clamping installation in turn has a first clamping leg and a second clamping leg which are mutually opposite, wherein at least one of said two clamping legs is elastically deformable, and wherein a fastening structure, while elastically deforming the clamping installation, is capable of being received in a spacing area between the two opposite clamping legs.

The advantage of this device according to the invention lies in that the holding element (and thus the tank installation component to be fastened thereby) is capable of being push-fitted onto a fastening structure, which for example and preferably is formed by the tank wall, only by way of the elastically deformable, that is to say flexible, clamping installation and without any welding or other auxiliary means, and a reliable fastening of the tank installation component is guaranteed on account thereof at least by virtue of the force-fit between the clamping installation and the fastening structure, said fastening being simultaneously able of being established in an easy and cost-efficient manner.

The device for fastening tank installation components can also be referred to as a component holder. The tank installation components are consequently the components to be held. Such a component is preferably a functional component which is provided for the orderly operation of a plastics-material tank. Preferred examples of such a functional component comprise a valve, a valve housing, a line, an aeration line, a ventilation line, a nipple, a manifold, or a sensor, preferably a filling-level sensor. The component is furthermore preferably provided for being disposed in the interior space of the plastics-material tank. The holding element can also be referred to as a receptacle element for receiving the tank installation component. The clamping installation can preferably also be referred to as a clamp and/or as a clamp installation.

While the device according to the invention can be produced from any suitable material known to a person skilled in the art, said device is preferably produced from a plastics material. In other words, both the holding element as well as the clamping installation having the two clamping legs are produced from a plastics material. The holding element and the at least one clamping installation connected to said holding element are yet furthermore preferably integrally produced. The device according to the invention is most preferably produced by the injection-molding method.

The holding element furthermore preferably has at least one receptacle, one clamping connection, one clip connection, and/or a recess for fastening a tank installation component. The holding element furthermore preferably has a substantially circular or rectangular cross section. The holding element is yet furthermore preferably connected to a tank installation component.

The first clamping leg in the installed position of the device is preferably disposed above the second clamping leg. The installed position herein is to be understood as the positioning of the device in space, when said device, for example for the intended use thereof, has been push-fitted onto the fastening structure which in turn is for example and preferably formed by the tank wall of a plastics-material tank. The plastics-material tank thereafter has further preferably been installed in a motor vehicle.

The clamping installation is preferably connected to the holding element by way of at least one connecting web. More preferably, the clamping installation is connected to the holding element by way of one or both of the two clamping legs. More preferably, the clamping installation is connected to the holding element only by way of one of the two clamping legs, wherein most preferably the clamping installation is connected to the holding element by way of the first clamping leg, that is to say the clamping leg which in the installed position is disposed above the further clamping leg. Furthermore preferably, this connection is likewise embodied by way of a connecting web. The connecting web preferably has a smaller longitudinal extent than the clamping leg that is connected to said connecting web. More preferably, the longitudinal extent of the connecting web is less than one half, less than one quarter, or most preferably less than one eighth of the longitudinal extent of the clamping leg that is connected to said connecting web. On account thereof, it is advantageously guaranteed that the clamping installation remains so as to be capable of elastic deformation.

While it is sufficient for the functioning of the device according to the invention that only one of the two clamping legs is elastically deformable, both clamping legs are preferably elastically deformable. On account thereof, an even more reliable force-fit is achieved between the clamping installation and the fastening structure. The elastic deformation capability of the at least one clamping leg can also be referred to as flexibility, that is to say that the at least one of the two clamping legs is flexible.

While the clamping legs of the clamping installation can have any design embodiment that appears suitable to a person skilled in the art, said clamping legs preferably have a substantially plate-shaped design embodiment, more preferably a plate-shaped design embodiment in which the surface which is provided for contacting the fastening structure is substantially planar. Furthermore preferably, the two clamping legs of the clamping installation are disposed so as to be substantially mutually parallel. On account thereof a particularly reliable fit of the device according to the invention on the fastening structure is advantageously achieved.

The two mutually opposite clamping legs of the clamping installation therebetween configure a spacing area. The fastening structure which is preferably configured by the wall of the plastics-material tank can later be received in this spacing area, for example when the device according to the invention is assembled in a plastics-material tank.

On account of the fastening structure being received between the two clamping legs, that is to say in the spacing area formed between the two clamping legs, the two clamping legs exert in each case a compressive force on the fastening structure. The force vectors, or the force directions, respectively, of the two clamping legs herein are directed toward one another. In other words, the fastening structure is firmly jammed by the clamping installation, or the device according to the invention is firmly clamped to or clamped on the fastening structure, respectively. The reliable fixing, which can be established in an easy and cost-effective manner, of the device according to invention and thus of a tank installation component fastened thereto, is advantageously guaranteed by said compressive force. Said fixing of the device according to the invention by way of the fastening structure is preferably performed by push-fitting the device according to the invention in a push-fitting direction onto the fastening structure, as will be explained in more detail hereunder, wherein the elastically deformable clamping installation by virtue of the design embodiment of the fastening structure is elastically deformed, that is to say in other words the spacing area and/or the distance between the two clamping legs is enlarged in the push-fitting.

While the fastening structure can be any suitable structure which permits at least one force-fit with the clamping installation of the device according to the invention, the fastening structure is preferably a fastening structure that is disposed in the plastics-material tank. In other words, the fastening structure is advantageously directly or indirectly connected to the internal side of the wall of the plastics-material tank and/or is particularly preferably composed of the wall of the plastics-material tank. The fastening structure can thus have been welded to the internal side of the wall of the plastics-material tank, for example. However, the fastening structure most particularly preferably is composed per se of the wall of the plastics-material tank. In this case, the fastening structure is furthermore preferably embodied as an inverted feature of the plastics-material tank which protrudes into the interior space of the plastics-material tank. The fastening structure has preferably been incorporated into the plastics-material tank by extrusion blow-molding during the production of the plastics-material tank. The efficient design embodiment of a fastening structure is advantageously possible on account thereof, wherein the fastening structure can at the same time likewise be imparted a special design embodiment which is optimized for the functioning of the fastening the device according to the invention, and wherein no additional add-on parts which serve as a fastening structure and which have to be attached in a further method step have to be used.

The device according to the invention furthermore preferably has at least two clamping installations, wherein the holding element is disposed between said clamping installations. In other words, the holding element is preferably flanked or bordered by the at least two clamping installations. The device according to the invention particularly preferably has two clamping installations which are disposed so as to be substantially mutually parallel. In other words, the two clamping installations are preferably disposed so as to be mutually symmetrical, furthermore preferably mutually mirror-symmetrical. The symmetry plane herein preferably runs through the center of the holding element. Such an arrangement is particularly advantageous when the two fastening structures required in this instance likewise have an opposite arrangement. In such a case, a particularly efficient and reliable fixing of the device according to the invention is advantageously guaranteed, said fixing being able to be established by simply push-fitting the device on the two mutually opposite fastening structures that are embodied in pairs.

Furthermore preferably, the second clamping legs of the two clamping installations, said second clamping legs in the installed position of the device being disposed at the bottom, or the first clamping legs of the two clamping installations, said first clamping legs in the installed position being disposed at the top, are connected to one another by way of a material bridge. This has the advantage that the clamping force of the two clamping installations is more uniformly distributed, on account of which an improved fit of the device according to the invention is guaranteed. Furthermore, the material bridge also preferably contacts at least one of the two fastening structures, on account of which the contact pressure face is advantageously enlarged and yet again an improved and more stable fit of the device according to the invention is guaranteed on account thereof. Most preferably, the in each case second clamping legs of the two clamping installations, that is to say the clamping legs that in the installed position of the device are disposed at the bottom, are connected to one another by way of a material bridge.

The material bridge between the two clamping installations is likewise preferably connected to the holding element by way of at least one connecting web. Particularly preferably, the material bridge is connected to the holding element by way of at least two connecting webs, wherein more preferably the connecting webs are disposed so as to be uniformly mutually spaced apart and uniformly spaced apart to the two clamping installations. The material bridge is most preferably connected to the holding element by way of two such connecting webs.

Furthermore preferably, the clamping installation is configured so as to be U-shaped or V-shaped such that the two clamping legs are connected to one another at a first end region of the clamping installation and the fastening structure is capable of being push-fitted into the spacing area between the two clamping legs by way of a second end region of the clamping installation, wherein the second end region is disposed so as to be opposite the first end region.

A U-shaped or V-shaped configuration of the clamping installation is to be understood to be a clamping installation that is configured so as to be U-shaped or V-shaped in cross section. Accordingly, the two clamping legs of the clamping installation are connected to one another at a first end region while said two clamping legs are not connected at the second end region. In other words, an introduction opening is formed at the second end region, by way of which introduction opening the fastening structure can be introduced or pushed into the spacing area formed between the two clamping legs by push-fitting the device according to the invention onto the fastening structure. On account of a U-shaped or V-shaped configuration of the clamping installation it is advantageously guaranteed that improved fixing is performed on account of the device according to the invention, since said device according to the invention cannot be moved farther in the direction of the push-fitting direction when the fastening structure contacts the end region that is formed by the two connected clamping legs.

The device according to the invention in a push-fitting direction is furthermore preferably capable of being push-fitted onto the fastening structure, wherein the push-fitting direction runs so as to be parallel to a connecting direction between the first end region of a clamping installation and the second end region of a clamping installation and runs in the direction of the second end region of the clamping installation. Particularly preferably, the device according to the invention has at least two clamping installations, wherein the respective push-fitting directions thereof run so as to be mutually parallel, more preferably in the same direction. In other words, the two openings that are formed on the end regions of the clamping installations point in the same direction. This is provided in particular when the at least two clamping installations are disposed so as to be substantially mutually parallel and flank the holding element. In such a case, there is advantageously only one push-fitting direction of the device according to the invention.

The device according to the invention on the clamping installation preferably has a holding protrusion which is disposed on a face of at least one clamping leg, said face facing the spacing area. More preferably, the holding protrusion is connected in a materially integral manner to the clamping leg. Most preferably, the clamping legs and the holding protrusion are integrally configured, particularly preferably by the injection-molding method. The holding protrusion is preferably configured for engaging in a depression and/or a recess of the fastening structure. An improved fit, or an improved fixing, respectively, of the device according to the invention is advantageously guaranteed on account thereof, and any movement of said device according to the invention along the push-fitting direction is in particular prevented. Most particularly preferably, and as will be explained further below, the holding protrusion is configured for engaging in a spacing area between two fastening structures that are configured in pairs and disposed so as to be mutually parallel.

The holding protrusion is furthermore preferably configured as a holding rib which in a more preferred embodiment on the face that faces the spacing area between the two clamping legs extends so as to be substantially transverse to the push-fitting direction. In other words, the holding protrusion, or the holding rib, respectively, preferably extends across a width extent of the clamping leg, wherein the width extent of the clamping leg is oriented so as to be perpendicular to the push-fitting direction of the fastening structure into the spacing area. On account thereof, any movement of the device along the push-fitting direction is advantageously further minimized In other words, an improved fixing of the device according to the invention is performed on account of the holding protrusion.

Furthermore preferably, a plurality of holding protrusions, and in particular holding ribs, are disposed on the face that faces the spacing area between the clamping legs. On account thereof, any movement of the device along the push-fitting direction is likewise reduced. The holding protrusions, or the holding ribs, respectively, are furthermore preferably disposed so as to be mutually parallel and more preferably disposed at uniform mutual spacings. Said holding protrusions, or holding ribs, respectively, likewise preferably protrude into the spacing area between the two clamping legs to a dissimilar extent. In the case of a number of at least three holding protrusions, the outer holding protrusions herein protrude into the spacing area between the two clamping legs to a lesser extent than the holding protrusion or the holding protrusions that is/are disposed therebetween. On account thereof, an improved form-fit of the holding protrusions, or the holding ribs, respectively, with the fastening structure, or the depression and/or recess provided therein, respectively, is advantageously achieved, on account of which the device according to the invention is again more reliably fixed.

The holding element of the device according to the invention furthermore preferably has at least one securing protrusion which is disposed on a face of the holding element, said face facing the spacing area between the two clamping legs. In other words, the securing protrusion, proceeding from the holding element, protrudes in the direction of the spacing area of the clamping installation. The securing protrusion in the installed position of the device according to the invention preferably contacts the fastening structure and by way of the force-fit and/or form-fit thus established with the fastening structure ensures a further improved and reliable fit of the device. On account of the securing protrusion any rotation of the device according to the invention about an axis that is perpendicular to the push-fitting direction can in particular be effectively avoided. Said axis is preferably likewise perpendicular to a face of at least one clamping leg, said face facing the spacing area.

A side of the securing protrusion that is aligned in the push-fitting direction of the device according to the invention is furthermore preferably configured so as to be radiused. Easier push-fitting of the device onto the fastening structure(s) is advantageously guaranteed on account thereof.

The securing protrusion is preferably connected to at least one of the two clamping legs of the clamping installation. More preferably, the securing protrusion is connected to the first clamping leg which in the installed position of the device is disposed above the second clamping leg.

Furthermore preferably, the second clamping legs of the two clamping installations, said second clamping legs in the installed position of the device being disposed at the bottom, or the first clamping legs of the two clamping installations, said first clamping legs in the installed position being disposed at the top, are in each case connected to the holding element by way of a material bridge. Such an embodiment is particularly preferred when the two first clamping legs of the two clamping installations, or the two second clamping legs of the clamping installation, are not connected to one another by way of a material bridge. This can be particularly advantageous when the spatial design embodiment of the tank installation component to be fastened does not permit or impede a material bridge between two clamping legs of dissimilar clamping installations. The connection of the first or the second clamping legs of the two clamping installations to the holding element advantageously contributes toward an improved stability of the device according to the invention. The contact pressure force which can be exerted on the fastening structure herein is in particular increased. Furthermore, an additional contact face between the device according to the invention and the fastening structure is achieved on account of the material bridge. All of said advantages lead to an improved and more stable fit of the device. Most preferably, the second clamping legs of the two clamping installations, said second clamping legs in the installed position of the device being disposed at the bottom, are in each case connected to the holding element by way of a material bridge.

Preferably, the material bridge that emanates from one of the clamping legs additionally contacts the securing protrusion which is disposed on that face of the holding element that faces the spacing area. In other words, the material bridge is additionally connected to said securing protrusion.

The clamping installation of the device according to the invention furthermore preferably has at least one securing web which is disposed on a face of at least one clamping leg, said face facing the spacing area, wherein the securing web is additionally disposed on an edge of the clamping leg, said edge facing the holding element.

The securing web preferably extends across a longitudinal extent of the clamping leg. The longitudinal extent of the clamping leg herein is oriented so as to be parallel to the push-fitting direction of the fastening structure into the spacing area.

The securing web in the direction of the holding element preferably and at least partially delimits the spacing area between the two clamping legs of one clamping installation. The securing web is furthermore preferably configured as a substantially planar element, the longitudinal extent of the latter, proceeding from the edge of the clamping leg, in the direction of the clamping leg that is opposite the latter clamping leg, being approximately at least one eighth, at least one quarter, or at least half the distance between the two opposite clamping legs. In each of these cases, the longitudinal extent of the securing web is most particularly preferably smaller than the distance between the two opposite clamping legs.

In the installed position of the device according to the invention, in a manner similar to the securing protrusion mentioned above, the securing web preferably contacts the fastening structure and by way of the force-fit and/or force-fit established thereby with the fastening structure ensures a further improved and more reliable fit of the device. On account of the securing protrusion any rotation of the device according to the invention about an axis that is perpendicular to the push-fitting direction can in particular be effectively avoided. Said axis is preferably likewise perpendicular to a face of at least one clamping leg, said face facing the spacing area.

In the case of a U-shaped or V-shaped design embodiment of the clamping installation, the securing web is furthermore preferably disposed in the connecting region of the mutually opposite clamping legs. Such an arrangement has advantageously proven very suitable for effectively avoiding the rotation of the device according to the invention as described above.

The clamping installation of the device according to the invention likewise preferably has at least two securing webs. Any rotation of the device according to the invention is advantageously avoided even more effectively on account thereof. These at least two securing webs are furthermore preferably distributed in a substantially uniform manner across the longitudinal extent of the clamping installation. The clamping installation furthermore preferably has two securing webs which are in each case disposed in one of the two end regions of the clamping installation.

The invention furthermore relates to a plastics-material tank, wherein the plastics-material tank has a tank wall having at least one fastening structure that is (directly or indirectly) connected to the tank wall and is disposed in the interior space of the plastics-material tank. The plastics-material tank according to the invention furthermore has the device according to the invention and described above for fastening tank installation components, wherein the fastening structure of the plastics-material tank is disposed in the spacing area between the two clamping legs of the clamping installation of the device. Accordingly, all of the features described above in the context of the device can also be applied to and combined with the plastics-material tank according to the invention to the extent that no mention is made otherwise.

The clamping installation, or the two clamping legs of the clamping installation, respectively, preferably exerts/exert a compressive force on the fastening structure. There is preferably a force-fit and/or a form-fit between the clamping installation and the fastening structure. The device furthermore preferably likewise has a tank installation component that is connected to the holding element.

While the fastening structure can be any suitable structure which permits at least one force-fit with the clamping installation of the device according to the invention, as has been explained above, the fastening structure is directly or indirectly connected to the internal side of the wall of the plastics-material tank, and/or is particularly preferably composed of the wall of the plastics-material tank.

A fastening structure that is composed of the wall of the plastics-material tank can also be referred to as a fastening structure that is formed by the wall of the plastics-material tank.

The fastening structure of the plastics-material tank is preferably embodied as an inverted feature of the plastics-material tank which protrudes into the interior space of the plastics-material tank. Such an inverted feature can also be referred to as an inverted collar. The fastening structure has furthermore preferably been incorporated into the plastics-material tank by extrusion blow-molding during the production of the plastics-material tank.

The plastics-material tank preferably has a tank wall having at least two fastening structures that are disposed on said tank wall and in the interior space of the plastics-material tank, wherein the at least two fastening structures are mutually opposite. The plastics-material tank furthermore has a device having at least two clamping installations, wherein the holding element of the device is disposed between said two clamping installations and the at least two mutually opposite fastening structures of the plastics-material tank are disposed in the spacing areas between the in each case two clamping legs of the two clamping installations of the device. A particularly reliable fixing of the device according to the invention and thus of the tank installation component to be fastened is advantageously achieved on account of such a design embodiment of the plastics-material tank.

The plastics-material tank particularly preferably has a device, the at least one clamping installation of said device having at least one holding protrusion which is disposed on a face of at least one clamping leg of the clamping installation, said face facing the spacing area, and wherein at least one fastening structure of the plastics-material tank has a latching recess in which the holding protrusion of the clamping installation engages. The plastics-material tank most particularly preferably has the mutually opposite two fastening structures, described above, and the device has two clamping installations having in each case at least one holding protrusion, wherein said holding protrusions engage in each case in one latching recess of the two fastening structures.

The latching recess of a fastening structure is likewise particularly preferably formed by two inverted features and/or inverted collars of the tank wall of the plastics-material tank, said inverted features and/or inverted collars being substantially identically aligned and mutually spaced apart. The configuration of suitable fastening structures having integrated latching recesses is advantageously facilitated on account thereof, this applying in particular to a production of the plastics-material tank by means of the extrusion blow-molding method.

These two identically aligned inverted features and/or inverted collars herein, in terms of the longitudinal extent thereof, are particularly preferably disposed so as to be substantially mutually parallel.

In a further preferred embodiment of the plastics-material tank the device according to the invention, while configuring a force-fit between the device and the tank wall of the plastics-material tank, is clamped between at least two fastening structures and the tank wall. At least one surface section of the device according to the invention herein is advantageously used for forming a contact face between the device and the internal side of the tank wall of the plastics-material tank. The device is reliably fixed by way of the force-fit between the device and the tank wall that is achieved by way of clamping the device. The two fastening structures herein serve as counterbearings.

The force-fit is preferably configured between at least one portion of a surface of the device, said surface in the installed position of the device being disposed topmost, and the tank wall of the plastics-material tank.

In a further preferred embodiment of the plastics-material tank the tank wall of the plastics-material tank has a receptacle in which the device engages in a force-fitting and/or form-fitting manner The force-fit and/or the form-fit is preferably configured between a portion of the device, furthermore preferably a portion of the device, said portion in the installed position of the device being disposed topmost, and the receptacle of the tank wall of the plastics-material tank.

The receptacle is preferably designed as a bulge of the tank wall, wherein the bulge can point in the direction of the device according to the invention or away from the device according to the invention. However, the bulge is preferably a bulge which points away from the device according to the invention. In other words, the bulge is a convex bulge of the tank wall. Advantageously, the device is additionally fixed and prevented from moving when the device according to the invention engages in the bulge.

That portion of the device according to the invention that engages in the bulge particularly preferably has a design embodiment that is substantially complementary to that of the bulge. On account thereof, any movement of the device in at least two spatial axes is effectively prevented. Particularly preferably, the bulge and/or that portion of the device according to the invention that engages in said bulge have/has a substantially rectangular shape.

Furthermore preferably, at least one of the edges of the second end region of the clamping installation and/or of the securing protrusion, said at least one edge pointing in the push-fitting direction, is designed so as to be radiused. On account thereof, an improved push-fitting behavior of the device according to the invention onto the fastening structure is advantageously achieved.

The individual embodiments of the invention described above can be freely combined with one another to the extent that no explicit mention has otherwise been made, or said embodiments are mutually exclusive.

BRIEF DESCRIPTION OF THE DRAWINGS

Further advantages, details, and features of the invention are derived hereunder from the exemplary embodiments explained. In the figures:

FIGS. 1A-1D show schematic views of an embodiment of the device according to the invention from different view angles;

DETAILED DESCRIPTION

Figure 1C:
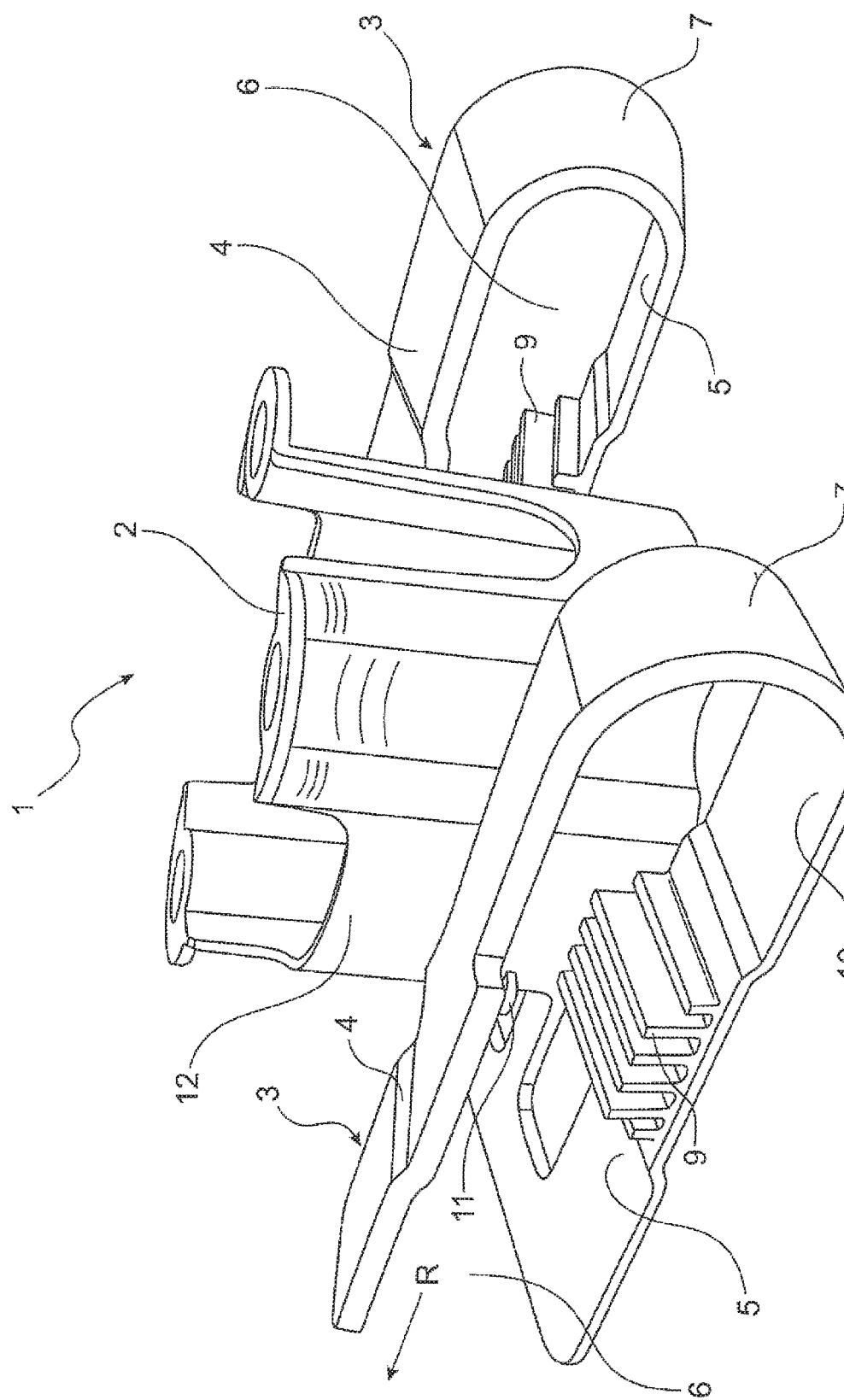
Figure 1D:
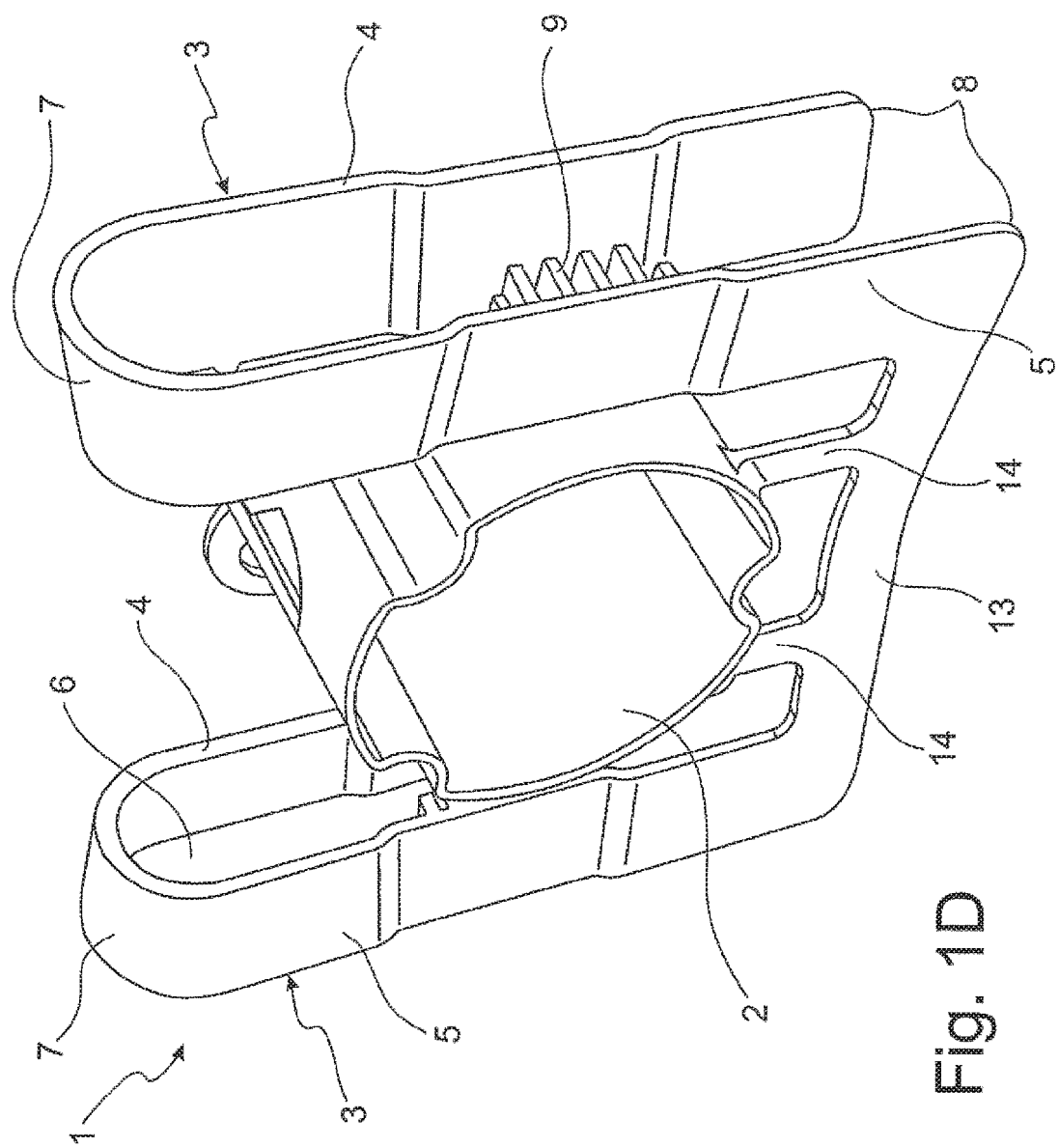

In the description now following, the same reference signs identify the same components or the same features such that a description pertaining to a component and carried out with reference to one figure also applies to the other figures.

Schematic views of a first embodiment of the device (1) according to the invention are illustrated from different view angles in FIGS. 1A to 1D.

The device for fastening tank installation components (1) is made integrally from a plastics material by the injection-molding method and has a holding element (2) which is suitable for holding functional tank installation components (not illustrated). The holding element has a substantially cylindrical shape, or a circular cross section, respectively, as well as receptacles for a tank installation component to be fastened, and is disposed between two elastically deformable clamping installations (3).

As can be derived in particular from FIG. 1B, the holding element (2) is disposed so as to be centered between the two clamping installations (3), the latter in turn being disposed so as to be mutually mirror symmetrical. The symmetry axis herein runs through the center of the holding element (2).

The two clamping installations (3) of the device (1) are configured so as to be U-shaped and have in each case one first clamping leg (4) and one second clamping leg (5), both clamping legs (4, 5) being elastically deformable. The first clamping leg (4) and the second clamping leg (5) of the clamping installation (3) are connected to one another at a first end region (7) of the clamping installation (3). A second end region (8) of the clamping installation (3) is opposite the first end region (7). Said second end region (8) configures an opening or introduction opening for the fastening structure (15) in the clamping installation (3).

Furthermore, the push-fitting direction (R) of each of the two clamping installations (3) is also defined by the first end region (7) and the second end region (8) of the clamping installations (3). Since said push-fitting directions (R) by virtue of the symmetrical arrangement of the two clamping installations (3) are disposed so as to be substantially mutually parallel, the push-fitting directions (R) of the two clamping installations (3) are congruent. In the assembly of the device (1) according to the invention in a plastics-material tank (18) the clamping installations (3) of the device (1) are pushed by way of two fastening structures (15) in the direction of the push-fitting direction (R), said fastening structures (15) being disposed in the interior space (20) of the plastics-material tank (18). While the fastening structures (15) are received in the spacing areas (6) of the two clamping installations (3), an elastic deformation of the clamping installations (3) and a reliable fixing of the device (1) are performed.

As can furthermore be derived in particular from FIG. 1A, the clamping installations (3) are in each case connected to the holding element (2) by way of the first clamping legs (4) of said clamping installations (3). The connection between the clamping installation (3) and the holding element (2) herein is performed by way of a connecting web which has a smaller longitudinal extent than the clamping leg (4) of the clamping installation (3), said clamping leg (4) being connected to the connecting web.

The clamping legs (4, 5) of the clamping installations (3) have a substantially plate-shaped design embodiment, wherein the surface (10) which faces the spacing area (6) and which is provided for contacting the fastening structure (15) is embodied so as to be substantially planar. As can likewise be derived from FIGS. 1A to 1D, the two clamping legs (4, 5) of the clamping installations (3) are disposed so as to be substantially mutually parallel.

A spacing area (6) is formed between the two clamping legs (4, 5) of the clamping installations (3). Said spacing area according to the invention serves for receiving a fastening structure (15) which is disposed in a plastics-material tank (18), for example, the device (1) by way of the clamping installations (3) thereof being fixed by way of said fastening structure (15) and by way of a compressive force that is exerted on the fastening structure (15).

The two second clamping legs (5) which in the installed position of the device (1) are disposed at the bottom are connected to one another by way of a material bridge (13). Moreover, the material bridge (13) is connected to the holding element (2) by way of two connecting webs (14), wherein the connecting webs (14) are disposed so as to be uniformly mutually spaced apart and uniformly spaced apart from the two clamping installations (3).

Furthermore to be seen in FIGS. 1A to 1D are six holding protrusions (9) per clamping installation (3), said holding protrusions (9) being configured as holding ribs and being disposed on the face (10) of the second clamping leg (5), said face (10) facing the spacing area (6). The six holding ribs (9) are disposed on the face (10) of the second clamping leg (5) so as to be transverse to the push-fitting direction (R) and thus extend across a width extent of said clamping leg (5). As can furthermore be seen, the outer two holding ribs (9) protrude into the spacing area (6) of the clamping installation (3) to a lesser extent than the remaining holding ribs (9).

As can furthermore be derived from FIGS. 1A to 1C, the device (1) furthermore has two securing protrusions (11) which are disposed on the holding element (2) and which are in each case disposed on a spacing area (6) of a face of the holding element (2), said face facing the two clamping installations (3). Accordingly, the securing protrusions (11), proceeding from the holding element (2), protrude in each case in the direction of the spacing areas (6) of the two clamping installations (3). Furthermore, the sides of the securing protrusions (11) that are aligned in the push-fitting direction (R) of the clamping installations (3) are configured so as to be radiused.

Figure 2A:
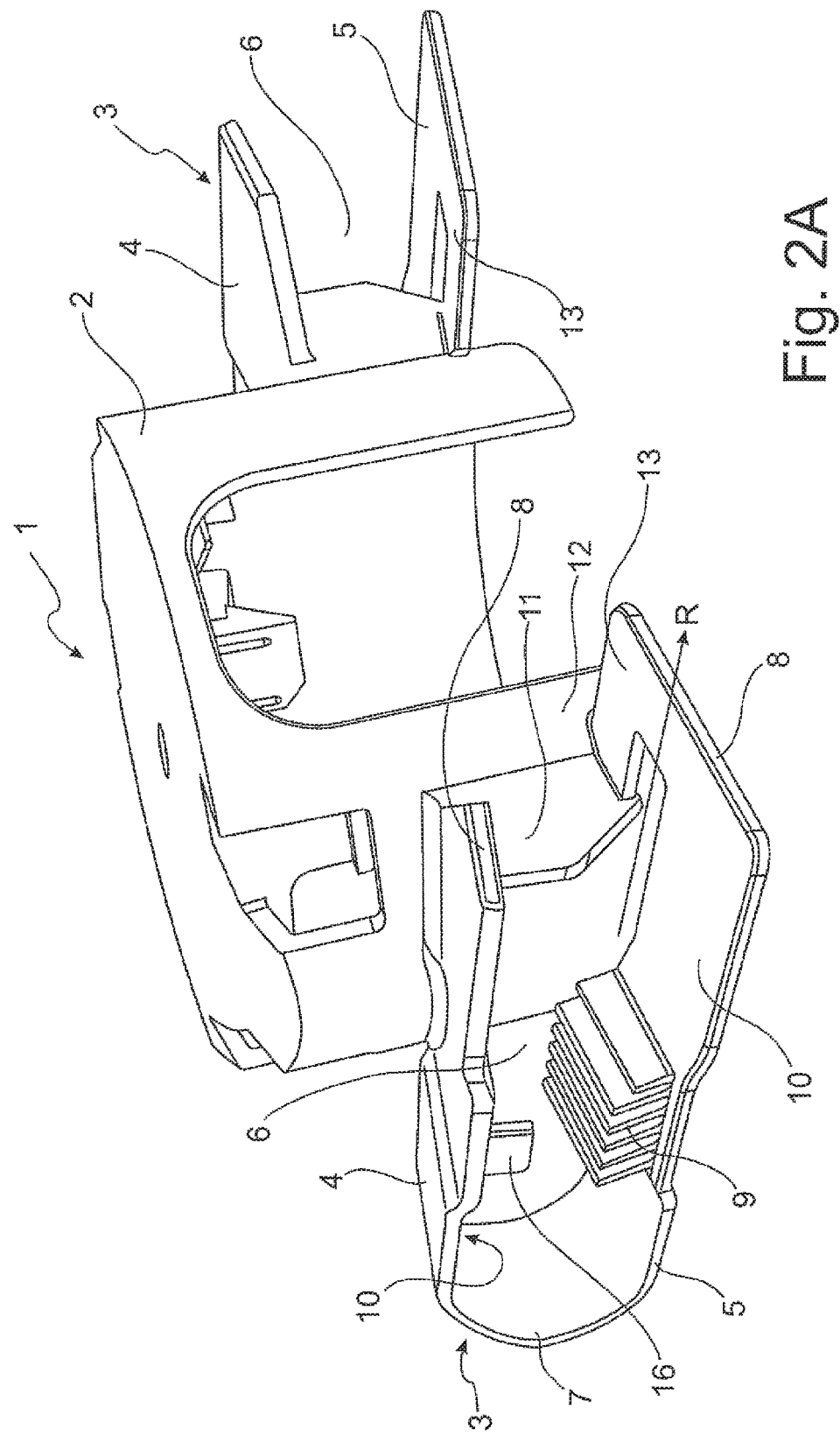
FIGS. 2A-2C show schematic views of a further embodiment of the device according to the invention from different view angles.
Figure 2B:
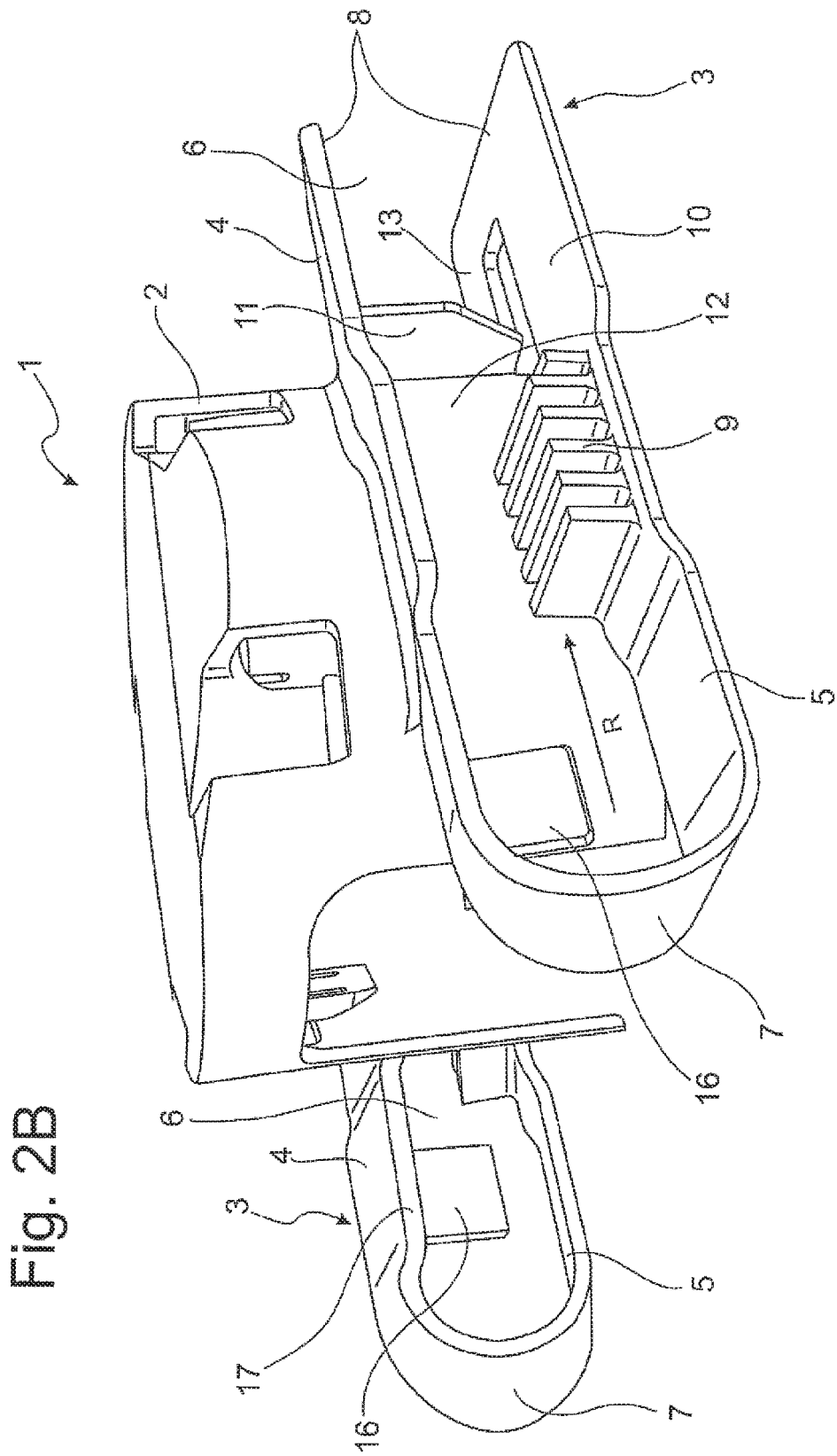
Figure 2C:
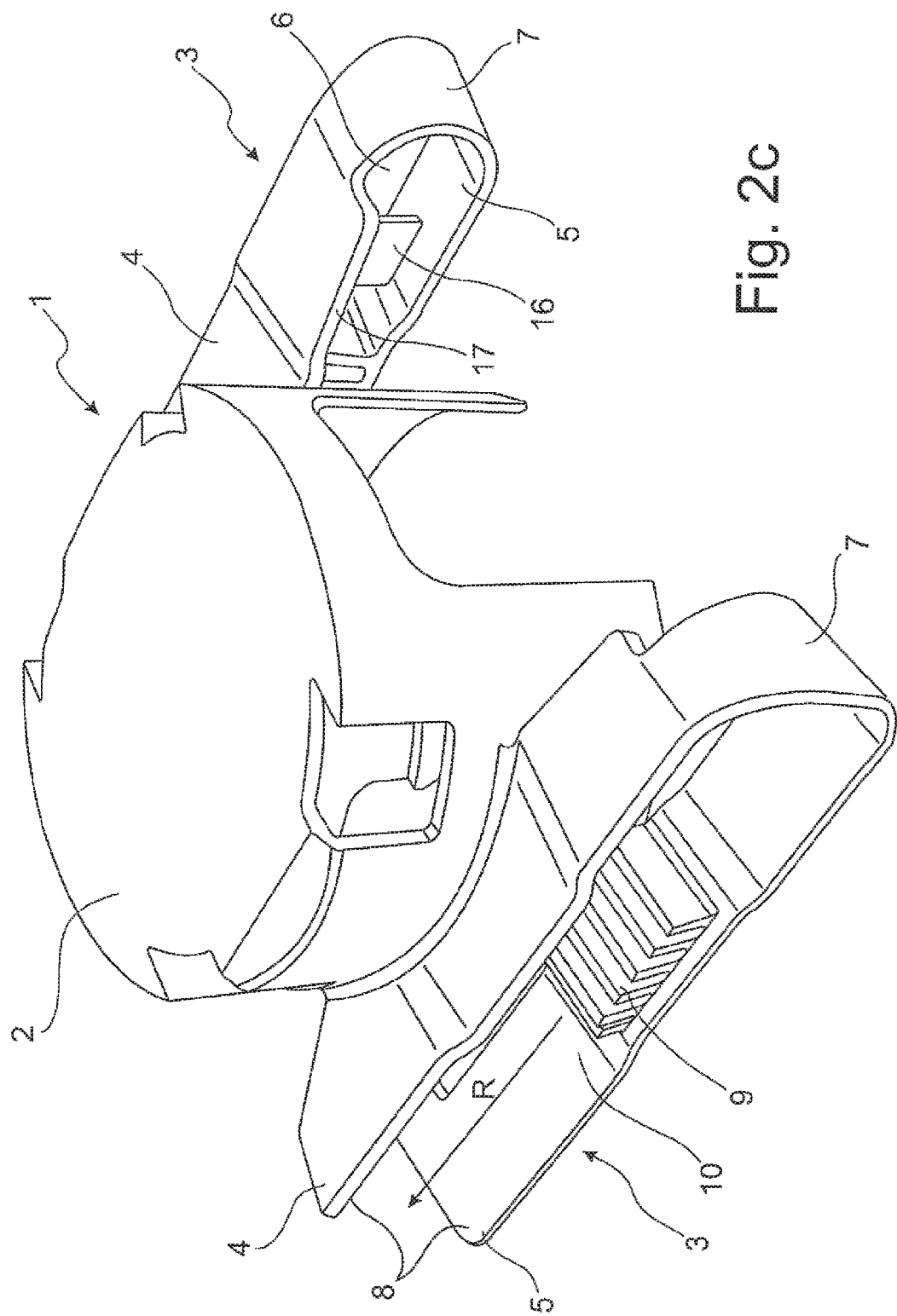

Schematic views of a further embodiment of the device according to the invention are illustrated from different view angles in FIGS. 2A to 2C. This embodiment is substantially identical to the embodiment which is illustrated in FIGS. 1A to 1D so that only the points of differentiation between the two embodiments will be discussed hereunder.

It can thus be derived from FIGS. 2A to 2C that the second clamping legs (5) of the two clamping installations (3), said second clamping legs (5) in the installed position being disposed at the bottom, are not connected to one another by way of a material bridge (13), but that there is in each case one material bridge (13) from the second clamping legs (5) of the two clamping installations (3) to the holding element (2). Furthermore, said material bridge (13) is simultaneously connected to the securing protrusion (11) which is designed as a planar element.

Furthermore, a securing web (16) which is configured so as to be planar and which is disposed on the face (10) of the first clamping legs (4), said face (10) facing the spacing area (6), and on the edge (17) of the first clamping leg (4), said edge (17) facing the holding element (2), is attached to each of the two clamping installations (3), in particular to the first clamping legs (4) of the latter. The securing webs (16) are in each case disposed in the first end region (7) of the clamping installations (3), partially delimit the spacing area (6) in the direction of the holding element (2), and have a longitudinal extent which corresponds to approximately one quarter of the distance between the two mutually opposite clamping legs (4, 5) of a clamping installation.

Figure 3A:
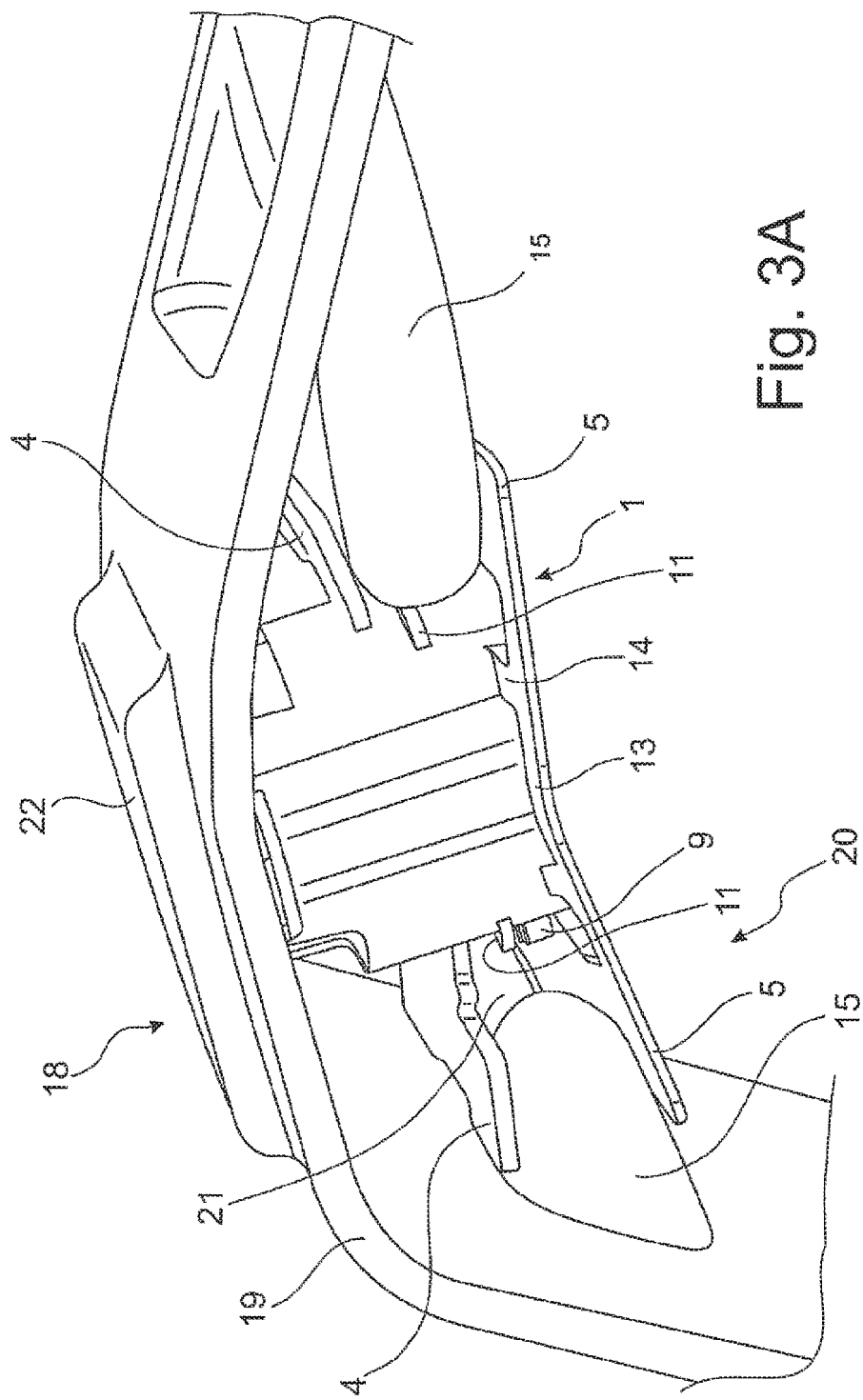
FIGS. 3A-3B show schematic views of a plastics-material tank according to the invention, having the device shown in FIGS. 1A-1D.
Figure 3B:
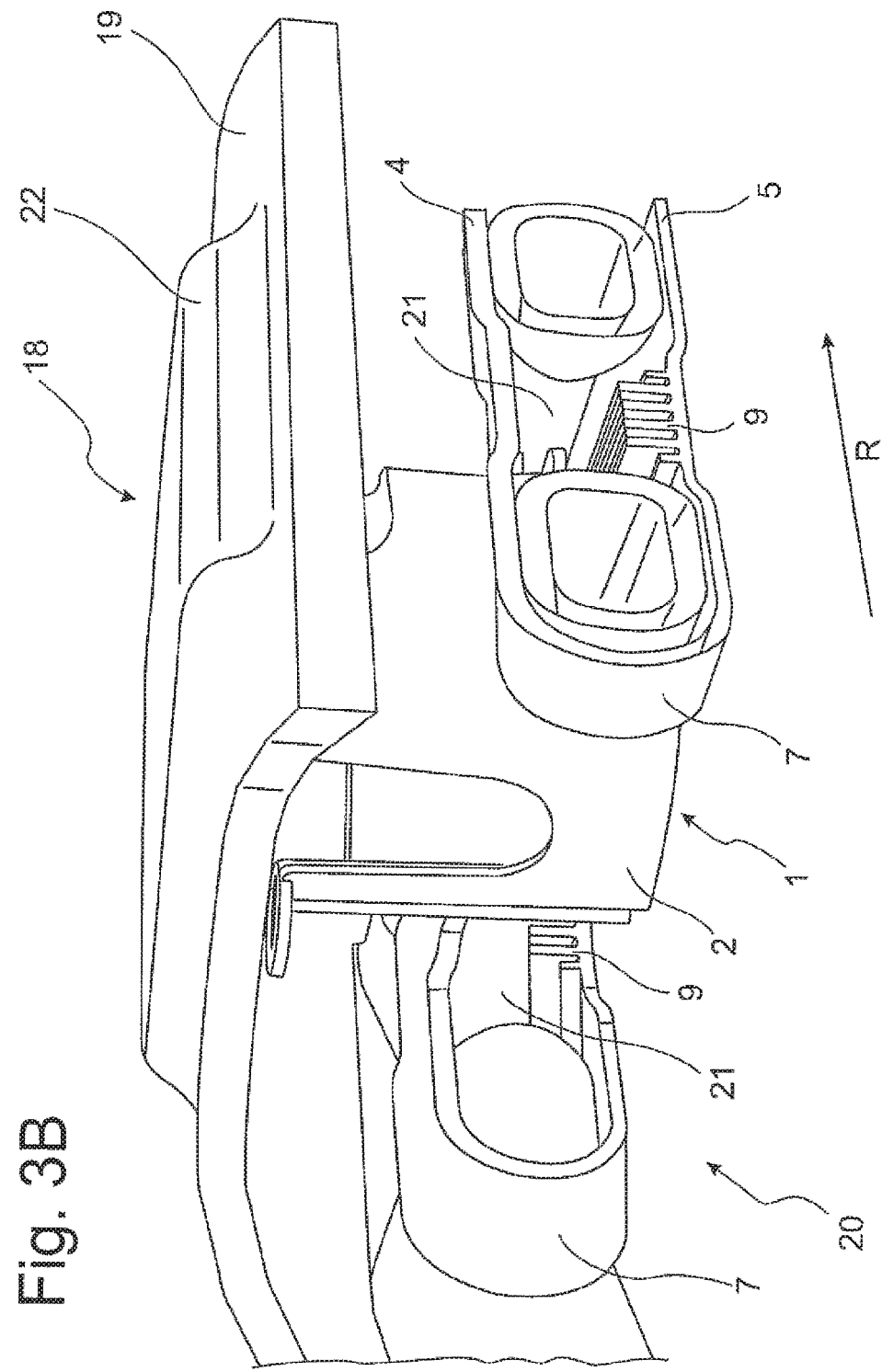

FIGS. 3A to 3B show schematic views of a fragment of the plastics-material tank (18) according to the invention, which includes the device (1) shown in FIGS. 1A to 1D. FIG. 3B herein shows in particular a section through the plastics-material tank according to the invention and the device according to the invention.

As can be derived from FIGS. 3A and 3B, the device (1) according to the invention has been push-fitted and thus fixed in the plastics-material tank (18) by push-fitting in the push-fitting direction (R) onto the fastening structures (15) of the plastics-material tank (18) in the plastics-material tank. The fastening structures (15) herein have been received in the spacing areas (6) of the clamping installations (3).

The fastening structures (15) are inverted features or inverted collars of the tank wall (19) of the plastics-material tank (18), said inverted features or inverted collars having been incorporated into the plastics-material tank (18) by extrusion blow-molding during the production of said plastics-material tank (18) and protruding into the interior space (20) of the plastics-material tank (18).

As can furthermore be derived, the two fastening structures (15) are disposed so as to be opposite in the interior space (20) of the plastics-material tank (18).

The fastening structures (15) have in each case one latching recess (21) in which the holding ribs (9) of the device (1) engage.

As can likewise be derived from FIGS. 3A and 3B, the two mutually opposite fastening structures (15) have been formed by pairs of inverted features of the tank wall (19) of the plastics-material tank (18), said inverted features being substantially identically aligned and mutually spaced apart, wherein the latching recesses (21) were configured between said spaced-apart inverted features.

Furthermore to be seen in the tank wall (19) of the plastics-material tank (18) is a receptacle (22) in which the device (1) according to the invention engages by way of a portion, in particular a portion that is disposed topmost in the installed position of the device. The receptacle (22) is designed as a convex bulge of the tank wall (19) of the plastics-material tank (18). The receptacle (22) and the portion of the device (1) engaging in said receptacle (22) have a substantially complementary design embodiment, wherein a form-fit arises between the device (1) and the receptacle (22) in the contact region.

LIST OF REFERENCE SIGNS

1 Device for fastening tank installation components; component holder
2 Holding element
3 Clamping installation
4 First clamping leg
5 Second clamping leg
6 Spacing area
7 First end region of the clamping installation
8 Second end region of the clamping installation
9 Holding protrusion; holding rib
10 Face of a clamping leg that faces the spacing area
11 Securing protrusion
12 Face of the holding element that faces the spacing area
13 Material bridge
14 Connecting web
15 Fastening structure; inverted feature; inverted collar
16 Securing web
17 Edge of the clamping leg that faces the holding element
18 Plastics-material tank
19 Tank wall of the plastics-material tank
20 Interior space of the plastics-material tank
21 Latching recess of the fastening structure
22 Receptacle in the tank wall of the plastics-material tank
R Push-fitting direction

What is claimed is:

1. A fastening device, comprising:
the device being configured to fasten at least one tank installation component by way of an internal side of a tank wall of a plastics-material tank, without the device extending through the tank wall of the plastics-material tank;
a holding element to hold the tank installation component;
at least one clamping installation connected to the holding element;
the clamping installation has two clamping legs, provided by a first clamping leg and a second clamping leg, which are mutually opposite;
at least one of the two clamping legs is elastically deformable;
a spacing area between the two clamping legs configured to receive a fastening structure formed by an inverted feature of the tank wall of the plastics-material tank which protrudes towards an interior space of the plastics-material tank;
the clamping installation configured to elastically deform when the fastening structure is disposed in the spacing area; and
the device is formed of injection molded plastics-material.

2. The device as claimed in claim 1, wherein:
the at least one clamping installation comprises at least two clamping installations; and
the holding element is disposed between the at least two clamping installations.

3. The device as claimed in claim 2, wherein:
each of the second clamping legs underlie one of the first clamping legs, respectively, and are connected to one another by a material bridge; and/or
each of the first clamping legs overlie one of the second clamping legs, respectively and are connected to one another by a material bridge.

4. The device as claimed in claim 2, wherein:
each of the second clamping legs underlie one of the first clamping legs, respectively, and are connected to the holding element by a material bridge; and/or
each of the first clamping legs overlie one of the second clamping legs, respectively and are connected to the holding element by a material bridge.

5. The device as claimed in claim 1, wherein:
the at least one clamping installation is U-shaped or V-shaped such that the two clamping legs are connected to one another at a first end region of the clamping installation; and
the spacing area is configured to receive the fastening structure by the fastening structure being push-fitted into the spacing area between the two clamping legs by a second end region of the clamping installation, wherein the second end region is disposed opposite the first end region.

6. The device as claimed in claim 5, wherein:
the device is configured to be push-fitted onto the fastening structure in a push-fitting direction, wherein the push-fitting direction runs parallel to a connecting direction between the first end region and the second end region and in a direction of the second end region.

7. The device as claimed in claim 1, wherein:
the clamping installation has at least one holding protrusion which is disposed on a face of at least one clamping leg of the two clamping legs, the face facing the spacing area.

8. The device as claimed in claim 1, wherein:
the holding element has at least one securing protrusion which is disposed on a face of the holding element, the face facing the spacing area.

9. The device as claimed in claim 1, wherein:
the clamping installation has at least one securing web which is disposed on a face of at least one clamping leg of the two clamping legs, the face facing the spacing area; and
the securing web is disposed on an edge of the clamping leg, the edge facing the holding element.

10. The device as claimed in claim 1, wherein:
the device is disposed within the plastics-material tank.

11. The device as claimed in claim 10, wherein:
the spacing area between the two clamping legs is occupied by the fastening structure formed by the inverted feature of the tank wall of the plastics-material tank.

12. The device as claimed in claim 10, wherein:
in a direction which is transverse to the pushing-direction and across a width extent of the clamping installation, a wall of the holding element faces the spacing area between the two clamping legs.

13. The device as claimed in claim 1, wherein:
the holding element has at least one receptacle to fasten the tank installation component.

14. The device as claimed in claim 1, wherein:
the holding element has at least one clamping connection to fasten the tank installation component.

15. The device as claimed in claim 1, wherein:
the holding element has at least one clip connection to fasten the tank installation component.

16. The device as claimed in claim 1, wherein:
the holding element has at least one recess to fasten the tank installation component.

17. A plastics-material tank, the tank comprising:
a tank wall having at least one fastening structure disposed at a side of the tank wall which faces an interior space of the plastics-material tank, the fastening structure formed by an inverted feature of the tank wall which protrudes towards the interior space of the plastics-material tank;
a device to fasten at least one tank installation component to the tank wall, wherein the device has
a holding element to hold the tank installation component;
at least one clamping installation connected to the holding element, wherein the clamping installation has two clamping legs, provided by a first clamping leg and a second clamping leg, which are mutually opposite, and at least one of the two clamping legs is elastically deformable; and
a spacing area between the two clamping legs configured to receive the fastening structure; and
wherein the fastening structure of the plastics-material tank is disposed in the spacing area between the two clamping legs of the clamping installation and at least one of the legs of the clamping installation is elastically deformed by the fastening structure.

18. The plastics-material tank as claimed in claim 17, wherein:
the tank wall having at least one fastening structure has at least two fastening structures disposed at the side of the tank wall which faces the interior space of the plastics-material tank, wherein the at least two fastening structures are mutually opposite;
the at least one clamping installation comprises at least two clamping installations;
wherein each of the two clamping installations has two clamping legs, provided by a first clamping leg and a second clamping leg, which are mutually opposite, and at least one of the two clamping legs of each clamping installation is elastically deformable;
wherein each of the two clamping structures has a spacing area between the two clamping legs configured to receive one of the two fastening structures; and
wherein each of the at least two fastening structures are disposed in the spacing areas between the two clamping legs of the two clamping installations, respectively.

19. The plastics-material tank as claimed in claim 18, wherein:
at least one clamping installation of the at least two clamping installations has at least one holding protrusion which is disposed on a face of at least one clamping leg of the two clamping legs, the face facing the spacing area;
the at least one fastening structure has a latching recess in which the holding protrusion engages.

20. The plastics-material tank as claimed in claim 18, wherein:
at least one of the two clamping legs of each of the two clamping installations is elastically deformed by the fastening structure, respectively.

21. The plastics-material tank as claimed in claim 17, wherein:
the tank wall has a receptacle in which at least one portion of the device engages in a force- fitting and/or form-fitting manner.

22. The plastics-material tank as claimed in claim 21, wherein the receptacle and the at least one portion of the device that engages in the receptacle have a complementary design.

* * * * *